US012584769B2

(12) United States Patent
Janisch et al.

(10) Patent No.:  US 12,584,769 B2
(45) Date of Patent:  Mar. 24, 2026

(54) INDUCTIVE POSITION SENSOR AND METHOD FOR DETECTING A MOVEMENT OF A CONDUCTIVE TARGET

(71) Applicant: Renesas Electronics America Inc., Milpitas, CA (US)

(72) Inventors: Josef Janisch, Ilz (AT); Rudolf Pichler, Stallhofen (AT); Juergen Kernhof, Bissingen (DE); Svilen Kastev, Sofia (BG)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 18/075,718

(22) Filed: Dec. 6, 2022

(65) Prior Publication Data

US 2023/0221149 A1     Jul. 13, 2023

(30) Foreign Application Priority Data

Jan. 10, 2022     (EP) ..................................... 22150689

(51) Int. Cl.
*G01D 5/20*       (2006.01)
*G01B 7/14*       (2006.01)
*G01B 7/30*       (2006.01)

(52) U.S. Cl.
CPC ............. *G01D 5/2053* (2013.01); *G01B 7/14* (2013.01); *G01B 7/30* (2013.01)

(58) Field of Classification Search
CPC . G01B 7/14; G01B 7/30; G01B 7/003; G01D 5/20; G01D 5/2013; G01D 5/202; G01D 5/2026; G01D 5/2046; G01D 5/2053; G01D 5/206; G01D 5/2066;
(Continued)

(56) References Cited

U.S. PATENT DOCUMENTS 4,853,604  A      8/1989  McMullin et al.
7,045,996  B2     5/2006  Lyon et al.
7,208,945  B2     4/2007  Jones et al.
(Continued)

FOREIGN PATENT DOCUMENTS

CN      112833772 A  *  5/2021  ............... G01B 7/30
EP      0530090 A1      3/1993
GB      2490115 A       10/2012

OTHER PUBLICATIONS

Extended European Search Report dated Jun. 8, 2022 issued in EP 22150689.2.

*Primary Examiner* — David M Schindler

(74) *Attorney, Agent, or Firm* — SCULLY, SCOTT, MURPHY & PRESSER, P.C.

(57)     ABSTRACT

An inductive position sensor and method for detecting a movement of a conductive target, having: at least a first and a second transmitter coil having the same shape and which are phase-shifted to each other, at least one oscillator for generating a first and a second transmitter signal having the same shape and which are phase shifted to each other and are applied to the first transmitter coil and second transmitter coil respectively, at least one receiver coil, and a processing unit for determining a phase-shift between the first or second transmitter signal and a receiver signal received at the receiver coil; the determined phase-shift corresponding to the position of the conductive target above the first and second transmitter coils.

10 Claims, 6 Drawing Sheets

(58) Field of Classification Search
  CPC .. G01D 5/2073; G01D 5/2216; G01D 5/2225;
    G01D 5/2233; G01D 5/2258; G01D
    5/2275
  See application file for complete search history.

(56)         References Cited

U.S. PATENT DOCUMENTS

| | | | |
|---|---|---|---|
| 2006/0232269 A1 | 10/2006 | Sills et al. | |
| 2008/0116883 A1 | 5/2008 | Ruehl | |
| 2010/0109491 A1* | 5/2010 | Miyazaki | H02K 29/12 |
| | | | 310/68 B |
| 2010/0315075 A1* | 12/2010 | Kamiya | G01B 7/30 |
| | | | 324/207.25 |
| 2011/0101968 A1 | 5/2011 | Brands et al. | |
| 2011/0109303 A1 | 5/2011 | Zhitomirsky | |
| 2019/0025088 A1* | 1/2019 | Utermoehlen | G01B 7/30 |
| 2019/0331541 A1* | 10/2019 | Janisch | G01D 5/2053 |
| 2021/0278260 A1* | 9/2021 | Elliott | G01D 5/2053 |
| 2021/0302206 A1 | 9/2021 | Ferreira Da Cunha et al. | |
| 2022/0307868 A1* | 9/2022 | Shaga | G01D 5/2046 |
| 2023/0104667 A1* | 4/2023 | Shaga | G01D 5/2275 |
| | | | 324/207.16 |

* cited by examiner

INDUCTIVE POSITION SENSOR AND METHOD FOR DETECTING A MOVEMENT OF A CONDUCTIVE TARGET

CROSS-REFERENCE TO RELATED APPLICATION

The subject application claims priority under 35 U.S.C. § 119 to European Patent Application No. EP 22150689.2, filed on Jan. 10, 2022. The entire disclosure of European Patent Application No. EP 22150689.2 is incorporated herein by this reference.

BACKGROUND

The invention relates to an inductive position sensor for detecting a movement of a conductive target. The invention further relates to a method for detecting a movement of a conductive target.

Many applications need position feedback of a moving target like a rotating member, for example in motor control systems. In most cases, an additional position sensor is mounted at one end of a rotating shaft of the motor to generate the required position information. In general, magnetic position sensors and inductive position sensors are known. Since current carrying parts like motor cables or battery cables, a rotating motor package, the stator of the motor or additional equipment like a motor brake cause magnetic fields that may disturb magnetic fields, the use of inductive position sensors is preferred to provide robustness against such magnetic fields.

There are disclosed techniques listed below.
[Patent Document 1] U.S. Pat. No. 4,853,604
[Patent Document 2] US Patent Application No. 2011/0101968
[Patent Document 3] U.S. Pat. No. 7,045,996
[Patent Document 4] U.S. Pat. No. 7,208,945
[Patent Document 5] US Patent Application No. 2008/0116883

Inductive position sensors implement a magnet-free technology, utilizing the physical principles of eddy currents or inductive coupling to detect the position of a target that is moving above a set of coils, including for example of one transmitter coil and two receiver coils, such as a sine receiver coil and a cosine receiver coil. Such an inductive sensor system is for example disclosed in Patent Document 1.

In a practical implementation of the three coils, one transmitter coil and two receiver coils, are typically provided as copper traces on a printed circuit board. They are arranged such that the transmitter coil induces a secondary voltage in the two receiver coils, which depends on the position of the conductive, e.g., metallic, target above the receiver coils. Therefore, the inductive sensor comprises or is connected to an oscillator that generates a radio-frequency signal, which is applied to the transmitter coil to create a static high frequency magnetic field. This static high frequency magnetic field is picked up by the receiver coils, such as the sine receiver coil and the cosine receiver coil. Depending on the position of the conductive target above the coils, the secondary voltage picked up by the receiver coils is changing in amplitude, allowing the determination of the target's position by analysing this effect. For example, the target position is calculated by the arctangent of the momentary sine signal amplitude divided by the momentary cosine signal amplitude. The calculation is performed by a processing unit, which is connected to the position sensor or integral part of the position sensor.

In order to process the receiver signals, a complex circuit containing a demodulator, a gain stage, offset and gain mismatch compensation, an analog-to-digital converter and a digital signal processing unit providing some form of arctangent calculation is necessary.

Patent Document 2 discloses an inductive position sensor for determining the position of a movable element. The position sensor comprises two subsystems, each having two transmitter units, an LC resonant circuit on the movable element and a receiver coil with an evaluation unit. The processing of the individual subsystems is carried out alternatively. Thus, if one subsystem is operating, all other subsystems are deactivated. The movable element including the LC resonant circuit rotates within a total electromagnetic field generated by the overlap of the two electromagnetic fields of the two transmitter units. In response, the LC resonant circuit will produce an electromagnetic field, which will be received by the receiver coil and the evaluation unit.

Patent Document 3 discloses a method for determining the position of a device including generating at least two, time-varying, magnetic fields using inductive elements, wherein the fields have different phases. The method further includes detecting a signal modulated on top of the fields, wherein the signal is generated from the device, and determining the position of the device based on a phase difference of the signal from the device and a reference signal. Like Patent Document 2, the disclosed method requires an LC resonant circuit on the moving device.

Patent Document 4 discloses a sensor comprising an excitation winding, a signal generator operable to generate an excitation signal and arranged to apply the generated excitation signal to the excitation winding, a sensor winding electromagnetically coupled to the excitation winding and a signal processor operable to process a periodic electric signal generated in the sensor winding when the excitation signal is applied to the excitation winding by the signal generator to determine a value of a sensed parameter. The excitation signal comprises a periodic carrier signal having a first frequency modulated by a periodic modulation signal having a second frequency, the first frequency being greater than the second frequency. In this way, the sensor is well suited to using digital processing techniques both to generate the excitation signal and to process the signal induced in the sensor windings. In an embodiment, the sensor is used to detect the relative position of two members. In other embodiments, the sensor is used to detect environmental factors such as temperature and humidity.

Patent Document 5 discloses an inductive sensor device and a method for inductive identification comprising a first exciter inductor and a second exciter inductor extending along a measurement range and vary spatially differently from each other. A first inductive coupling element and a second inductive coupling element couple a signal from the two exciter inductors into a receiver inductor. The inductive coupling elements are formed as resonance elements with a first resonance frequency f1 and a second resonance frequency f2. In order to be able to simply determine the position of both inductive coupling elements quickly and accurately, the two exciter inductors are driven by different transmission signals S1, S2. Each of the transmission signals S1, S2 includes signal components of a first carrier frequency near the first resonance frequency f1 varying in temporal progression, and of a second carrier frequency near the second resonance frequency f2 varying in temporal progression.

It may be desirable to overcome the disadvantages of conventional position sensors and to reduce the signal processing effort in the analog domain, while keeping the sensor design simple.

SUMMARY

An inductive position sensor for detecting a movement of a conductive target, according to an embodiment, is disclosed. The inductive position sensor comprising:

at least a first transmitter coil and a second transmitter coil, wherein the first transmitter coil and the second transmitter coil have the same shape and are phase-shifted to each other, at least one oscillator for generating a first transmitter signal and a second transmitter signal, wherein the first transmitter signal and the second transmitter signal have the same shape and are phase-shifted to each other and are applied to the first transmitter coil and the second transmitter coil respectively, at least one receiver coil, wherein the conductive target moves above the first transmitter coil and the second transmitter coil, and a processing unit for determining a phase-shift between the first transmitter signal or the second transmitter signal and a receiver signal received at the receiver coil, wherein the determined phase-shift corresponds to the position of the conductive target above the first transmitter coil and the second transmitter coil.

The first transmitter coil and the second transmitter coil are connected to the at least one oscillator for generating electromagnetic fields. For example, the first transmitter coil is connected to a first oscillator and the second transmitter coil is connected to a second oscillator. The first transmitter coil and the second transmitter coil generate a rotating electromagnetic transmitter field, due to the phase-shift between the first transmitter coil and the second transmitter coil and between the first transmitter signal and the second transmitter signal. At least two transmitter coils are provided for generating the rotating electromagnetic transmitter field. However, the same principle for generating a rotating electromagnetic transmitter field is applicable to a set of more than two transmitter coils.

The generated rotating electromagnetic transmitter field is picked up by the receiver coil. If no conductive target is placed above the first transmitter coil and the second transmitter coil, the resulting signal picked up by the receiver coil is zero. If the conductive target is placed above the first transmitter coil and the second transmitter coil, the generated electromagnetic fields induce eddy currents on the surface of the conductive target. The induced eddy currents generate a counter magnetic field, thereby reducing the total flux density underneath. The voltage induced underneath the conductive target is reduced, creating an imbalance in the first transmitter field and the second transmitter field. Areas that are covered by the conductive target generate a weaker resulting magnetic field and areas that are not covered by the conductive target generate a stronger resulting magnetic field. The output voltage of the receiver coil changes in phase relative to the first transmitter signal and the second transmitter signal, depending on the position of the conductive target.

The position of the conductive target can be directly determined by the processing unit by detecting the phase-shift between the signal of the receiver coil and the first transmitter signal or the second transmitter signal.

The advantage that may be provided by the position sensor is that both the analog and digital signal processing are much simpler. Instead of introducing a demodulator, gain control, analog-to-digital converter (ADC) and digital arctangent signal processing, a simple phase measurement is sufficient.

In a variant, the first transmitter coil and the second transmitter coil and/or the first transmitter signal and the second transmitter signal are phase-shifted by 90°. For example, the first transmitter coil is a sine transmitter coil, the second transmitter coil is a cosine transmitter coil, the first transmitter signal is a sine signal, and the second transmitter signal is a cosine signal.

Applying a sine-shaped signal to the first sine transmitter coil and a cosine-shaped signal to the second cosine transmitter coil (or the other way round) generates the sensor excitation signals. The sine amplitude and the cosine amplitude are modulated mechanically by the same conductive target and are related to the coil layout. The single receiver coil is generating a receiver signal that is equivalent to the sum of the resulting magnetic fields from the two phase-shifted transmitter signals. By using the trigonometric 'Addition Theorem' the mechanical angle or position 'α' appears as a phase-shift in the receiver signal. By changing the polarity of the excitation fields or coil layout, the following signals can be generated:

$$\sin(\alpha)\cos(\omega_X t) + \cos(\alpha)\sin(\omega_X t) = \sin(\alpha + \omega_X t)$$

$$\sin(\alpha)\cos(\omega_X t) - \cos(\alpha)\sin(\omega_X t) = \sin(\alpha - \omega_X t)$$

$$\cos(\alpha)\cos(\omega_X t) - \sin(\alpha)\sin(\omega_X t) = \cos(\alpha - \omega_X t)$$

$$\cos(\alpha)\cos(\omega_X t) + \sin(\alpha)\sin(\omega_X t) = \cos(\alpha + \omega_X t)$$

According to a variant, the first transmitter coil and the second transmitter coil each comprise two wire loops, which are wound in opposite directions. For example, the first wire loop has one or more periods in the movement direction of the conductive target and the second wire loop has one or more periods opposite the movement direction of the conductive target.

For example, the first transmitter coil is wound that it creates two wire loops A and C, which are wound in opposite direction, i.e., clockwise and counterclockwise, depending on the current flowing in them. For instance, the current in the first loop A is flowing counterclockwise, while the current in the second loop C is flowing clockwise. Reversing the polarity of the voltage applied to the terminals of the first transmitter coil, also reverses the current flow in the first loop A and the second loop C, now creating a clockwise current flow in the first loop A and a counterclockwise current flow in the second loop C. The electromagnetic fields generated by the first loop A and the second loop C are always of opposite polarity. Consequently, if no conductive target is placed above the first transmitter coil, the voltage of the receiver signal received by the receiver coil is zero as the fields generated by the first loop A and the second loop C cancel each other.

Since the second transmitter coil has the same shape as the first transmitter coil and is only phase-shifted, the second transmitter coil accordingly is wound such that it creates two wire loops B and D, which are wound in opposite direction, i.e., clockwise and counterclockwise, depending on the current flowing in them. For instance, the current in the first loop B is flowing counterclockwise, while the current in the second loop D is flowing clockwise. Reversing the polarity of the voltage applied to the terminals of the second transmitter coil, also reverses the current flow in the first loop B and the second loop D, now creating a clockwise current flow in the first loop B and a counterclockwise current flow in the second loop D. The electromagnetic fields generated by the first loop B and the second loop D are always of opposite polarity. Consequently, if no conductive target is placed above the second transmitter coil, the voltage of the receiver signal received by the receiver coil is zero as the fields generated by the first loop B and the second loop D cancel each other.

Pursuant to a variant, the first transmitter coil, the second transmitter coil and the at least one receiver coil are arranged on a substrate, wherein the first transmitter coil and the second transmitter coil are superimposed. For example, the first transmitter coil and the second transmitter coil are superimposed and the receiver coil surrounds the superimposed first transmitter coil and second transmitter coil. Furthermore, the processing unit can also be arranged on the substrate. The substrate can be a printed circuit board and the first transmitter coil, the second transmitter coil and the at least one receiver coil are formed by copper traces on the substrate. In a variant wherein the inductive position sensor is a radial position sensor and the conductive target is connected or connectable to a rotating shaft and the first transmitter coil, the second transmitter coil and the at least one receiver coil at least partially surround the rotating shaft.

For a radial inductive position sensor, the transmitter coils and the receiver coil are arranged in a plane perpendicular to the longitudinal axis of the rotating shaft. The conductive target is attached to the rotating shaft and extends in a radial direction, so that the conductive target is moving above the set of coils. This configuration is also referred to as an axial inductive position sensor as the set of coils is arranged in an axial plane.

According to an alternative variant, the inductive position sensor is a linear motion sensor and the conductive target can move along a movement path, wherein the first transmitter coil, the second transmitter coil and the at least one receiver coil are arranged along the movement path.

Pursuant to a variant, the inductive position sensor further comprises a zero-crossing comparator for detecting zero-crossing of the first transmitter signal or the second transmitter signal and the receiver signal and further comprising a first counter for determining the delay between the zero-crossing of the first transmitter signal or the second transmitter signal and the receiver signal. By detecting the zero-crossings of the first transmitter signal or the second transmitter signal and the receiver signal, the phase delay between both signals can be easily determined by using the first counter. The receiver signal is phase-shifted relative to the first transmitter signal and the second transmitter signal, depending on the position of the conductive target. Since the phase-shift between the first transmitter signal and the second transmitter signal is fixed, it is sufficient to determine the phase-shift between either the first transmitter signal or the second transmitter signal and the receiver signal. The phase-shift between the first transmitter signal or the second transmitter signal and the receiver signal is directly proportional to the position of the conductive target.

In a variant, the processing unit determines the phase-shift between the first transmitter signal or the second transmitter signal and the receiver signal for rising and falling edges of the first transmitter signal or the second transmitter signal and/or the receiver signal. For example, a digital counter will be started at the positive slope of the first transmitter signal or the second transmitter signal and will be stopped at the positive slope of the receiver signal. Furthermore, the digital counter can be started at the negative slope of the first transmitter signal or the second transmitter signal and will be stopped at the negative slope of the receiver signal.

The phase of the first transmitter signal and/or the second transmitter signal can be determined using a second counter, which is started at the positive slope and/or negative slope of the first transmitter signal and/or the second transmitter signal and stopped at the respective next positive slope and/or negative slope of the respective first transmitter signal and/or the second transmitter signal.

For example, the first transmitter signal and second transmitter signal are generated digitally with a digital-to-analog converter assuring a high phase precision. The zero-crossing comparator can be a fast and precise analog zero-crossing comparator.

If the phase delay between the first transmitter signal or the second transmitter signal and the receiver signal is measured for the positive slope and the negative slope, the results can be averaged to compensate potential offsets in the receiver signal:

$$\text{Position1}[°] = \frac{t_{falling_{edge}} * 360°}{t_{period}}$$

$$\text{Position2}[°] = \frac{t_{rising_{edge}} * 360°}{t_{period}}$$

$$\text{Position }[°] = \frac{\text{Position1} + \text{Position2}}{2}$$

This simple formula for averaging two positions can be applied as long as no single position is wrapped over 360°. If one position is wrapped over 360° a correction must be added:

if $(\text{Position1} - \text{Position2}) \le |180°|$ then: $\text{Position}[°] =$ $$\frac{\text{Position1} + \text{Position2}}{2}$$

if $(\text{Position1} - \text{Position2}) > |180°|$ then: $\text{Position}[°] =$ $$\frac{\text{Position1} + \text{Position2} + 360°}{2}$$

With this approach by using zero-crossing comparators and counters, the position or angle resolution depends on timing relations only.

With this approach, in order to achieve high resolution of the calculated position, the delay time measurement is required to have a very high clock frequency. For example, in order to achieve a resolution of 10 bits=1024 steps over the 0° . . . 360° position range, the clock frequency of the delay time measurement needs to be 1024 times higher than the frequency of the measured signal. For example, to measure the phase-shift of a 2 MHz signal with a resolution of 10 bits, a timer clock frequency of 1024×2 MHz=2048 MHz=2.048 GHz is required An N-bit position or angle resolution can be achieved if the frequencies of the excitation $F_X$ and the digital clock $F_{DIG}$ follow the relation:

$$F_{DIG} \ge 2N^{+1} * F_X$$

wherein $F_{DIG}$=counter clock frequency and $F_X$=transmitter oscillator frequency.

According to an alternative variant, the inductive position sensor comprises a zero-crossing comparator for detecting zero-crossing of the first transmitter signal or the second transmitter signal and the receiver signal and wherein the processing unit in combination with the at least one oscillator can adjust the phase of the first transmitter signal and the second transmitter signal, wherein the processing unit uses the zero-crossing comparator to change the phase of the first transmitter signal and the second transmitter signal, which can be phase shifted by 90° relative to the first transmitter signal, until the first transmitter signal or the second transmitter signal and the receiver signal have identical zero-crossings.

This alternative approach bases on a digital phase compensation by applying a 'phase delay β' for the first transmitter signal and the second transmitter signal. A counter is not necessary in this variant. The condition of 'equal phase' is detected if the 'receive phase window' matches exactly the digitally generated internal excitation phase (i.e., phase of the first transmitter signal or the second transmitter signal). This condition can be e.g., detected by an Exclusive-OR logic component). According to this variant, the internal phase delay is tracking rapidly the receiver signal by using the synchronized zero-crossing comparator values. The following equations are describing this procedure:

$$\sin(\alpha)\cos(\omega_x t + \beta) + \cos(\alpha)\sin(\omega_x t + \beta) = \sin(\alpha + \omega_x t + \beta)$$

$$\sin(\alpha + \omega_x t + \beta) \equiv \sin(\omega_x t), \text{ if } '\alpha = -\beta'$$

In this variant, the requirement for a high frequency timer clock for the direct phase measurement is removed by reducing the phase-shift measurement to detect only a phase-shift of 0 degrees. This can be accomplished by shifting the phase of the transmitter signal, until it is in alignment with the receiver signal, in which case the phase-shift between the first transmitter signal and the second transmitter signal is 0°. The phase-shift between the receiver signal and the first transmitter signal or the second transmitter signal depends on the position of the conductive target as well as the phase of the first transmitter signal and the second transmitter signal. If the phase of the transmitter signal is fixed, a target rotating from ≥0° to <360° also results in a phase-shift between the first transmitter signal, the second transmitter and the receiver signal from ≥0° to <360°. Consequently, at a given fixed position of the conductive target, if the phase of the first transmitter signal and the second transmitter signal is changed from ≥0° to <360°, it will likewise change the phase-shift between transmitter and the first receiver signal or the second receiver signal from ≥0° to <360°. The latter effect is utilized in this variant by changing the phase of the first transmitter signal and the second transmitter signal until it is aligned with the receiver signal, or in other words until the phase-shift between the first transmitter signal or the second transmitter signal and the receiver signal is zero under the condition that the second transmitter signal is always phase-shifted by 90°.

This variant does not require a high frequency counter. Rather, it rotates the phase of the first transmitter signal along with the phase of the second transmitter signal which is 90° phase-shifted relative to the first transmitter signal, until the first transmitter signal or the second transmitter signal is in phase alignment with the receiver signal. Once the first transmitter signal or the second transmitter signal is aligned with the receiver signal, by finding the minimum voltage difference between the first transmitter signal and the second transmitter signal, the corresponding transmitter phase is representative of the conductive target position.

In an embodiment, the inductive position sensor is further comprising a polarity inverter for the receiver signal, wherein the processing unit determines the phase-shift between the first transmitter signal or the second transmitter signal and the receiver signal for the original polarity and the inverted polarity of the receiver signal and calculates an average to compensate for DC offsets in the receiver signal. This avoids errors from DC offsets on the receiver signal, which affect the length of the phase window and consequently cause an error in the calculated position. Thus, the phase comparison is performed twice, with normal polarity of the receiver signal, resulting in 'Position1' and with inverted polarity of the receiver signal, resulting in 'Position2', wherein the inverted signal is the remaining position to 360° and 'Position3'=360°−'Position2'.

Like the other variant, a potential wrapping over 360° must be corrected. When the absolute difference between both calculated positions is >180° and offset of +360° must be added to the sum of the two signals:

if $(\text{Position1} - \text{Position3}) \leq |180°|$ then: Position [°] =

$$\frac{\text{Position1} + \text{Position3}}{2}$$

if $(\text{Position1} - \text{Position3}) > |180°|$ then: Position [°] =

$$\frac{\text{Position1} + \text{Position3} + 360°}{2}$$

A method for detecting a movement of a conductive target using an inductive position sensor according another embodiment is disclosed. The method comprises the steps of:

Applying a first transmitter signal to a first transmitter coil and a second transmitter signal to a second transmitter coil, wherein the first transmitter coil and the second transmitter coil have the same shape and are phase-shifted to each other and wherein the first transmitter signal and the second transmitter signal have the same shape and are phase-shifted to each other, receiving a receiver signal at a receiver coil, and determining a phase-shift between the first transmitter signal or the second transmitter signal and the receiver signal, wherein the determined phase-shift corresponds to the position of the conductive target above the first transmitter coil and the second transmitter coil.

The first transmitter coil and the second transmitter coil generate a rotating electromagnetic transmitter field, due to the phase-shift between the first transmitter coil and the second transmitter coil and between the first transmitter signal and the second transmitter signal. At least two transmitter coils are provided for generating the rotating electromagnetic transmitter field. However, the same principle for generating a rotating electromagnetic transmitter field is applicable to a set of more than two transmitter coils.

The first transmitter signal and the second transmitter signal can be generated by a first oscillator and a second oscillator respectively.

The generated rotating electromagnetic transmitter field is picked up by the receiver coil. If no conductive target is placed above the first transmitter coil and the second transmitter coil, the resulting signal picked up by the receiver coil is zero. If the conductive target is placed above the first transmitter coil and the second transmitter coil, the generated electromagnetic fields induce eddy currents on the surface of the conductive target. The induced eddy currents generate a counter magnetic field, thereby reducing the total flux density underneath. The voltage induced underneath the conductive target is reduced, creating an imbalance in the first transmitter field and the second transmitter field. Areas that are covered by the conductive target generate a weaker resulting magnetic field and areas that are not covered by the conductive target generate a stronger resulting magnetic field. The output voltage of the receiver coil changes in phase relative to the first transmitter signal and the second transmitter signal, depending on the position of the conductive target.

The position of the conductive target can be directly determined by detecting the phase-shift between the receiver signal of the receiver coil and the first transmitter signal or the second transmitter signal.

The advantage that may be provided by the method is that both the analog and digital signal processing are much simpler. Instead of introducing a demodulator, gain control, analog-to-digital converter (ADC) and digital arctangent signal processing, a simple phase measurement is sufficient.

In a variant, the first transmitter coil and the second transmitter coil and/or the first transmitter signal and the second transmitter signal are phase-shifted by 90°. For example, the first transmitter coil is a sine transmitter coil, the second transmitter coil is a cosine transmitter coil, the first transmitter signal is a sine signal, and the second transmitter signal is a cosine signal.

Applying a sine-shaped signal to the first sine transmitter coil and a cosine-shaped signal to the second cosine transmitter coil (or the other way round) generates the sensor excitation signals. The sine amplitude and the cosine amplitude are modulated mechanically by the same conductive target and are related to the coil layout. The single receiver coil is generating a receiver signal that is equivalent to the sum of the resulting magnetic fields from the two phase-shifted transmitter signals. By using the trigonometric 'Addition Theorem' the mechanical angle or position 'α' appears as a phase-shift in the receiver signal. By changing the polarity of the excitation fields or coil layout, the following signals can be generated:

$$\sin(\alpha)\cos(\omega_X t)+\cos(\alpha)\sin(\omega_X t)=\sin(\alpha+\omega_X t)$$

$$\sin(\alpha)\cos(\omega_X t)-\cos(\alpha)\sin(\omega_X t)=\sin(\alpha-\omega_X t)$$

$$\cos(\alpha)\cos(\omega_X t)-\sin(\alpha)\sin(\omega_X t)=\cos(\alpha-Cwt)$$

$$\cos(\alpha)\cos(\omega_X t)+\sin(\alpha)\sin(\omega_X t)=\cos(\alpha+\omega_X t)$$

According to a variant, the first transmitter coil and the second transmitter coil each comprise two wire loops, which are wound in opposite directions. For example, the first wire loop has one or more periods in the movement direction of the conductive target and the second wire loop has one or more periods opposite the movement direction of the conductive target.

For example, the first transmitter coil is wound that it creates two wire loops A and C, which are wound in opposite direction, i.e., clockwise and counterclockwise, depending on the current flowing in them. For instance, the current in the first loop A is flowing counterclockwise, while the current in the second loop C is flowing clockwise. Reversing the polarity of the voltage applied to the terminals of the first transmitter coil, also reverses the current flow in the first loop A and the second loop C, now creating a clockwise current flow in the first loop A and a counterclockwise current flow in the second loop C. The electromagnetic fields generated by the first loop A and the second loop C are always of opposite polarity. Consequently, if no conductive target is placed above the first transmitter coil, the voltage of the receiver signal received by the receiver coil is zero as the fields generated by the first loop A and the second loop C cancel each other.

Since the second transmitter coil has the same shape as the first transmitter coil and is only phase-shifted, the second transmitter coil accordingly is wound such that it creates two wire loops B and D, which are wound in opposite direction, i.e., clockwise and counterclockwise, depending on the current flowing in them. For instance, the current in the first loop B is flowing counterclockwise, while the current in the second loop D is flowing clockwise. Reversing the polarity of the voltage applied to the terminals of the second transmitter coil, also reverses the current flow in the first loop B and the second loop D, now creating a clockwise current flow in the first loop B and a counterclockwise current flow in the second loop D. The electromagnetic fields generated by the first loop B and the second loop D are always of opposite polarity. Consequently, if no conductive target is placed above the second transmitter coil, the voltage of the receiver signal received by the receiver coil is zero as the fields generated by the first loop B and the second loop D cancel each other.

Pursuant to a variant, the first transmitter coil, the second transmitter coil and the at least one receiver coil are arranged on a substrate, wherein the first transmitter coil and the second transmitter coil are superimposed. For example, the first transmitter coil and the second transmitter coil are superimposed and the receiver coil surrounds the superimposed first transmitter coil and the superimposed second transmitter coil. Furthermore, the processing unit can also be arranged on the substrate. The substrate is a printed circuit board and the first transmitter coil, the second transmitter coil and the at least one receiver coil are formed by copper traces on the substrate.

In a variant, the method detects a rotational movement of the conductive target connected to a rotating shaft, wherein the first transmitter coil, the second transmitter coil and the at least one receiver coil at least partially surround the rotating shaft.

According to an alternative variant, the method detects a linear motion of the conductive target along a movement path, wherein the first transmitter coil, the second transmitter coil and the at least one receiver coil are arranged along the movement path. Pursuant to a variant, the method further comprises the step of detecting a zero-crossing of the first transmitter signal or the second transmitter signal and the receiver signal and determining the delay between the zero-crossing of the first transmitter signal or the second transmitter signal and the receiver signal, based on, for example, a counter signal. By detecting the zero-crossings of the first transmitter signal or the second transmitter signal and the receiver signal, the phase delay between both signals can be easily determined by using a counter. The receiver signal is phase-shifted relative to the first transmitter signal and the second transmitter signal, depending on the position of the conductive target. Since the phase-shift between the first transmitter and the second transmitter signal is fixed, it is sufficient to determine the phase-shift between either the first transmitter signal or the second transmitter signal and the receiver signal. The phase-shift between the first transmitter signal or the second transmitter signal and the receiver signal is directly proportional to the position of the conductive target.

In a variant, the method comprises the steps of detecting rising and falling edges of the first transmitter signal or the second transmitter signal and/or the receiver signal and determining the phase-shift between the first transmitter signal or the second transmitter signal and the receiver signal for rising and falling edges of the first transmitter signal or the second transmitter signal and/or the receiver signal. For example, a digital counter will be started at the positive slope of the first transmitter signal or the second transmitter signal and will be stopped at the positive slope of the receiver signal. Furthermore, a digital counter can be started at the negative slope of the first transmitter signal or the second transmitter signal and will be stopped at the negative slope of the receiver signal.

The phase of the first transmitter signal and/or the second transmitter signal can be determined using a second counter, which is started at the positive slope and/or the negative slope of the first transmitter signal and/or the second transmitter signal and stopped at the respective next positive slope and/or negative slope of the respective first transmitter signal and/or the second transmitter signal.

For example, the first transmitter signal and the second transmitter signal are generated digitally with a digital-to-analog converter assuring a high phase precision. The zero-crossing comparator is, for example, a fast and precise analog zero-crossing comparator.

If the phase delay between the first transmitter signal or the second transmitter signal and the receiver signal is measured for the positive slope and the negative slope, the results can be averaged to compensate potential offsets in the receiver signal:

$$\text{Position1}[°] = \frac{t_{falling_{edge}} * 360°}{t_{period}}$$

$$\text{Position2}[°] = \frac{t_{rising_{edge}} * 360°}{t_{period}}$$

$$\text{Position}[°] = \frac{\text{Position1} + \text{Position2}}{2}$$

This simple formula for averaging two positions can be applied as long as no single position is wrapped over 360°. If one position is wrapped over 360° a correction must be added:

if $(\text{Position1} - \text{Position2}) \leq |180°|$ then: Position [°] =

$$\frac{\text{Position1} + \text{Position2}}{2}$$

if $(\text{Position1} - \text{Position2}) > |180°|$ then: Position [°] =

$$\frac{\text{Position1} + \text{Position2} + 360°}{2}$$

With this approach by using zero-crossing comparators and counters, the position or angle resolution depends on timing relations only.

With this approach, in order to achieve high resolution of the calculated position, the delay time measurement is required to have a very high clock frequency. For example, in order to achieve a resolution of 10 bits=1024 steps over the 0° . . . 360° position range, the clock frequency of the delay time measurement needs to be 1024 times higher than the frequency of the measured signal. For example, to measure the phase-shift of a 2 MHz signal with a resolution of 10 bits, a timer clock frequency of 1024×2 MHz=2048 MHz=2.048 GHz is required An N-bit position or angle resolution can be achieved if the frequencies of the excitation $F_X$ and the digital clock $F_{DIG}$ follow the relation:

$$F_{DIG} \geq 2N+1 * F_x$$

wherein $F_{DIG}$=counter clock frequency and $F_X$=transmitter oscillator frequency.

According to an alternative variant, the method further comprises the steps of detecting zero-crossing of the first transmitter signal or the second transmitter signal and the receiver signal and adjusting the phase of the first transmitter signal and the second transmitter signal, wherein the phase of the first transmitter signal and the second transmitter signal, which can be phase-shifted by 90° relative to the first transmitter signal, is changed until the first transmitter signal or the second transmitter signal and the receiver signal have identical zero-crossings.

This alternative approach bases on a digital phase compensation by applying a 'phase delay β' for the first transmitter signal and the second transmitter signal. A counter is not necessary in this variant. The condition of 'equal phase' is detected if the 'receive phase window' matches exactly the digitally generated internal excitation phase (i.e., phase of the first or second transmitter signal). This condition can be e.g., detected by an Exclusive-OR logic component). According to this variant, the internal phase delay is tracking rapidly the receiver signal by using the synchronized zero-crossing comparator values. The following equations are describing this procedure:

$$\sin(\alpha)\cos(\omega_x t+\beta)+\cos(\alpha)\sin(\omega_x t+\beta)=\sin(\alpha+\omega_x t+\beta)$$

$$\sin(\alpha+\omega_x t+\beta)=\sin(\omega_x t), \text{ if } `\alpha=-\beta'$$

In this variant, the requirement for the high frequency timer clock for the direct phase measurement is removed by reducing the phase-shift measurement to detect only a phase-shift of 0°. This can be accomplished by shifting the phase of the transmitter signal, until it is in alignment with the receiver signal, in which case the phase-shift between the two signals is 0°. The phase-shift between the receiver signal and the first transmitter signal or the second transmitter signal depends on the position of the conductive target as well as the phase of the first transmitter signal and the second transmitter signal. If the phase of the transmitter signal is fixed, a target rotating from ≥0° to <360° also results in a phase-shift between the transmitter signal(s) and the receiver signal from ≥0° to <360°. Consequently, at a given fixed position of the conductive target, if the phase of the first transmitter signal and the second transmitter signals is changed from ≥0° to <360°, it will likewise change the phase-shift between the first transmitter signal or the second transmitter signal and the receiver signal from ≥0° to <360°. The latter effect is utilized in this variant by changing the phase of the first transmitter signal and the second transmitter signal until it is aligned with the receiver signal, or in other words until the phase-shift between first transmitter signal or the second transmitter signal and the receiver signal is zero under the condition that the second transmitter signal is always phase-shifted by 90°.

This variant does not require a high frequency counter. Rather, it rotates the phase of the first transmitter signal along with the phase of the second transmitter signal, until the first transmitter signal or the second transmitter signal is in phase alignment with the receiver signal. Once the first transmitter signal or the second transmitter signal is aligned with the receiver signal, by finding the minimum voltage difference between the first transmitter signal or the second transmitter signal and the receiver signal, the corresponding transmitter phase is representative of the target position.

In an embodiment, the method comprises the steps of inverting the polarity of the receiver signal and determining the phase-shift between the first transmitter signal or the second transmitter signal and the receiver signal for the original polarity and the inverted polarity of the receiver signal and calculating an average to compensate for DC offsets in the receiver signal. This avoids errors from DC offsets on the receiver signal, which affect the length of the phase window and consequently cause an error in the calculated position. Thus, the phase comparison is performed twice, with normal polarity of the receiver signal, resulting in 'Position1' and with inverted polarity of the receiver signal, resulting in 'Position1', wherein the inverted signal is the remaining position to 360° and 'Position3'=360°−'Position2'. Like the other variant, a potential wrapping over 360° must be corrected. When the absolute difference between both calculated positions is >180° and offset of +360° must be added to the sum of the calculated 'Position1' and calculated 'Position3':

if (Position1 − Position3) ≤ |180°| then: Position [°] =

$$\frac{Position1 + Position3}{2}$$

if (Position1 − Position3) > |180°| then: Position [°] =

$$\frac{Position1 + Position3 + 360°}{2}$$

The conductive target can be any kind of metal, such as aluminium, steel or a printed circuit board with a printed copper layer. For example, an inductive position sensor can comprise a metallic target.

BRIEF DESCRIPTION OF THE DRAWINGS

In the following, the invention will be further explained with respect to the embodiments shown in the figures. It shows.

DETAILED DESCRIPTION

Figures 1, 2A, 2B, 2C, 2D:
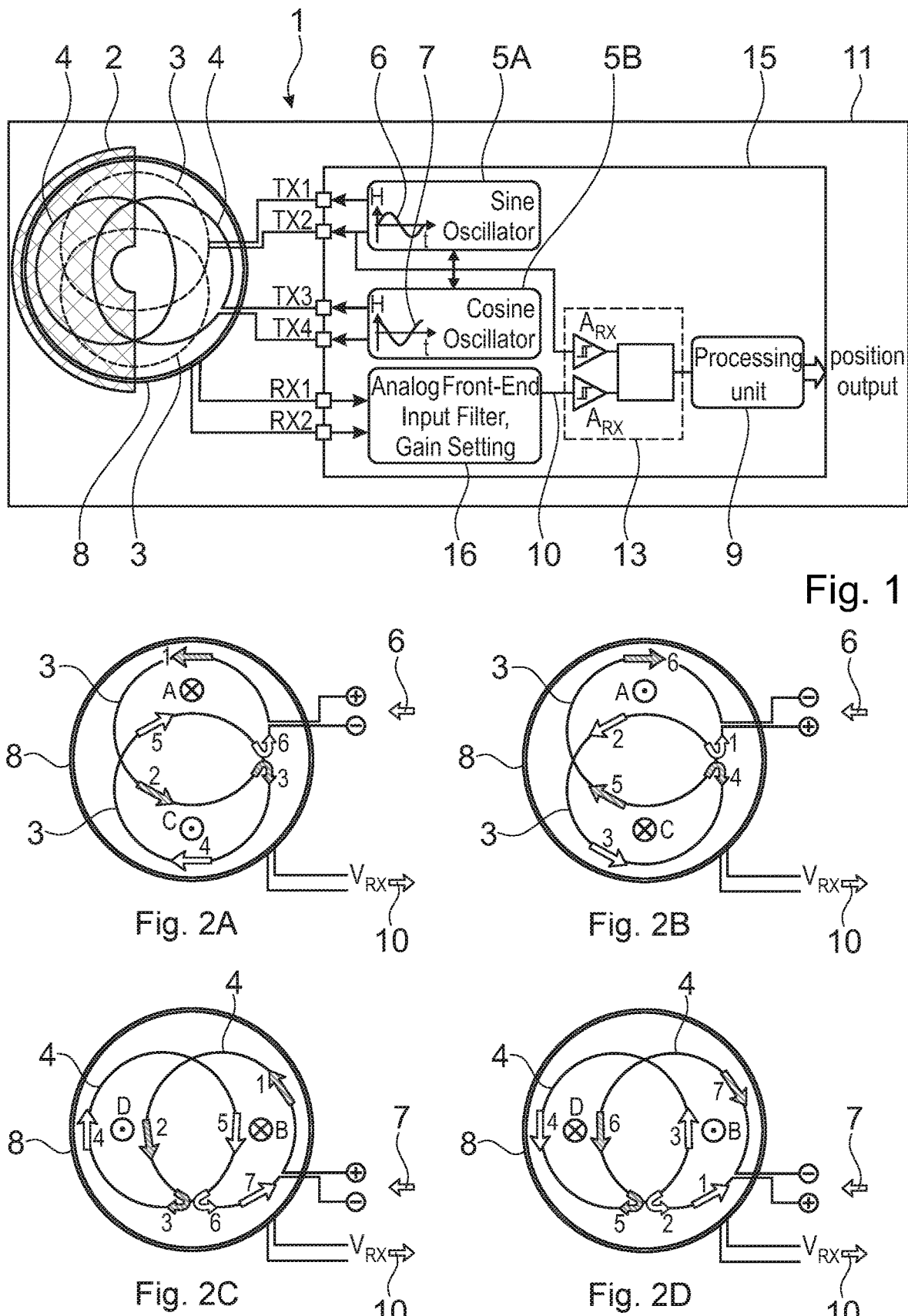
FIG. 1 a block diagram of an inductive position sensor according to a first embodiment, FIGS. 2A-D different conditions of the transmitter coils and receiver coil of the inductive position sensor, FIG. 3 exemplary transmitter and receiver signals for an inductive position sensor with a conductive target at 0°, FIG. 4 exemplary transmitter and receiver signals for an inductive position sensor with a conductive target at 90°, FIG. 5 exemplary transmitter and receiver signals for an inductive position sensor with a conductive target at 180°, FIG. 6 exemplary transmitter and receiver signals for an inductive position sensor with a conductive target at 270°, FIG. 7 a block diagram of an inductive position sensor according to a second embodiment, FIG. 8 a block diagram of an inductive position sensor according to a third embodiment, and FIG. 9 a block diagram of an inductive position sensor according to a fourth embodiment.

FIG. 1 shows a block diagram of an inductive position sensor 1 for detecting a movement of a conductive target 2 according to a first embodiment. The inductive position sensor 1 shown in FIG. 1 is a radial position sensor, which detects a rotational movement of the conductive target 2. The conductive target 2 for example is a metal plate covering 180° around the rotational axis of the conductive target 2.

The inductive position sensor 1 comprises a first transmitter coil 3 and a second transmitter coil 4. The first transmitter coil 3 and the second transmitter coil 4 have the same shape and are phase-shifted to each other. For example, the first transmitter coil 3 and the second transmitter coil 4 are phase-shifted by 90°, like for a first sine transmitter coil 3 and a second cosine transmitter coil 4. The conductive target 2 moves above the first transmitter coil 3 and second transmitter coil 4.

Each of the first transmitter coil 3 and the second transmitter coil 4 comprise two wire loops (A, B, C, D), which are wound in opposite directions, as will be explained below in detail with respect to FIGS. 2A-D.

The inductive position sensor 1 according to the first embodiment shown in FIG. 1 comprises a first oscillator 5A for the first transmitter coil 3 and a second oscillator 5B for the second transmitter coil 4. The first oscillator 5A connected to the first transmitter coil 3 generates a first transmitter signal 6 and the second oscillator 5B connected to the second transmitter coil 4 generates a second transmitter signal 7. The first transmitter signal 6 and the second transmitter signal 7 have the same shape and are phase-shifted to each other. The first transmitter signal 6 and the second transmitter signal 7 can be shifted by 90°, like in case of a first sine transmitter signal 6 and a second cosine transmitter signal 7. The first transmitter signal 6 is applied to the first transmitter coil 3 and the second transmitter signal 7 is applied to the second transmitter coil 4.

The inductive position sensor 1 of FIG. 1 further comprises a receiver coil 8. The receiver coil 8 surrounds the first transmitter coil 3 and the second transmitter coil 4.

The first transmitter coil 3, the second transmitter coil 4 and the receiver coil 8 are partly covered by the conductive target 2. The first transmitter signal 6 applied to the first transmitter coil 3 and second transmitter signal 7 applied to the second transmitter coil 4 generate a superimposed electromagnetic field. This electromagnetic field is picked-up by the receiver coil 8, which in turn provides a receiver signal 10. The receiver signal 10 depends on the position of the conductive target 2, as the superimposed electromagnetic field generated by the first transmitter coil 3 and the second transmitter coil 4 induces eddy currents in the conductive target 2, which in turn changes the electromagnetic field picked-up by the receiver coil 8. For example, the phase of the receiver signal 10 changes with the position of the conductive target 2.

The first transmitter coil 3, the second transmitter coil 4 and the receiver coil 8 are arranged on a substrate 11. The substrate 11 is for example a printed circuit board and the first transmitter coil 3, the second transmitter coil 4 and the receiver coil 8 are formed by copper traces on the substrate.

The first transmitter coil 3 and the second transmitter coil 4 are superimposed, to generate a superimposed electromagnetic field. For example, the first transmitter coil 3 and the second transmitter coil 4 are arranged in the same area of the substrate 11, but on different layers.

The inductive position sensor 1 of FIG. 1 further comprises a processing unit 9 for detecting a phase-shift between the first transmitter signal 6 or the second transmitter signal 7 and the receiver signal 10 received at the receiver coil 8. Since the phase-shift between the first transmitter signal 6 and the second transmitter signal 7 is fixed, i.e., does not change, it is sufficient to detect the phase-shift between the first transmitter signal 6 or second transmitter signal 7 and the receiver signal 10. The determined phase-shift corresponds to the position of the conductive target 2 above the first transmitter coil 3 and the second transmitter coil 4.

The phase-shift between the first transmitter signal 6 or the second transmitter signal 7 and the receiver signal 10 can be determined by different methods. For example, a zero-crossing comparator 13 can be used to detect zero-crossing of the first transmitter signal 6 or the second transmitter signal 7 and of the receiver signal 10. Based on the zero-crossing of the first transmitter signal 6 or the second transmitter signal 7 and the receiver signal 10, the phase-shift can be determined, as will be explained in more detail below.

The first oscillator 5A and second oscillator 5B, the zero-crossing comparator 13, the processing unit 9 and optional further analog signal processing components 16 like filter, gain setting circuit or similar can be contained in an integrated circuit (IC) chip 15, which is also arranged on the substrate 11, for example, soldered on the substrate 11.

FIGS. 2A-D shows different conditions of the first transmitter coil 3, the second transmitter coil 4 and the receiver coil 8 of the inductive position sensor 1.

FIG. 2A shows the first transmitter coil 3 and the receiver coil 8. The second transmitter coil 4 has been neglected for clarity purposes in FIG. 2A. The first transmitter coil 3 comprises two wire loops A and C, which are wound in opposite directions, clockwise and counterclockwise, depending on the current flowing in them. For example, in FIG. 2A the current in loop A is flowing counterclockwise, while in loop C it is flowing clockwise. Reversing the polarity of the voltage applied to the terminals of the first transmitter coil 3, as shown in FIG. 2B, also reverses the current flow which creates a clockwise current flow in loop A and a counterclockwise current flow in loop C. By applying the "left hand rule," one can see that the fields generated in loops A and C are always of opposite polarity. Symbol ⊙ indicates a positive magnetic field flowing out of the plane of view and symbol ⊗ indicates a negative magnetic field flowing into the plane of view. Consequently, if no conductive target 2 is placed above or below the first transmitter coil 3, the resulting secondary voltage $V_{RX}$, picked-up by the secondary receiver coil 8 that surrounds the first transmitter coil 3 and the second transmitter coils 4 is zero as the two fields A and C cancel each other.

FIG. 2C shows the second transmitter coil 4 and the receiver coil 8. The first transmitter coil 3 has been neglected for clarity purposes in FIG. 2C. The second transmitter coil 4 comprises two wire loops B and D, which are wound in opposite directions, clockwise and counterclockwise, depending on the current flowing in them. For example, in FIG. 2C the current in loop B is flowing counterclockwise, while it is flowing clockwise in loop D. Reversing the polarity of the voltage applied to the terminals of the second transmitter coil 4, as shown in FIG. 2D, also reverses the current flow which creates a clockwise current flow in loop B and a counterclockwise current flow in loop D.

By applying the "left hand rule," one can see that the fields generated in loop B and loop D are always of opposite polarity. Symbol ⊙ indicates a positive magnetic field flowing out of the plane of view and symbol ⊗ indicates a negative magnetic field flowing into the plane of view. Consequently, if no conductive target 2 is placed above or below the second transmitter coil 4, the resulting secondary voltage $V_{RX}$, picked up by the receiver coil 8 that surrounds the first transmitter coil 3 and the second transmitter coil 4 is zero as the two fields B and D cancel each other.

By superimposing the first transmitter coil 3 and the second transmitter coil 4 and applying the first transmitter signal 6 to the first transmitter coil 3 and 90° phase-shifted the second transmitter signal 7 to the second transmitter coil 4, a rotating magnetic field is generated. As long as no conductive target 2 is placed above or below the first transmitter coil 3 and the second transmitter coil 4, the receiver signal 10 remains zero as all fields combined cancel each other.

Figure 3:
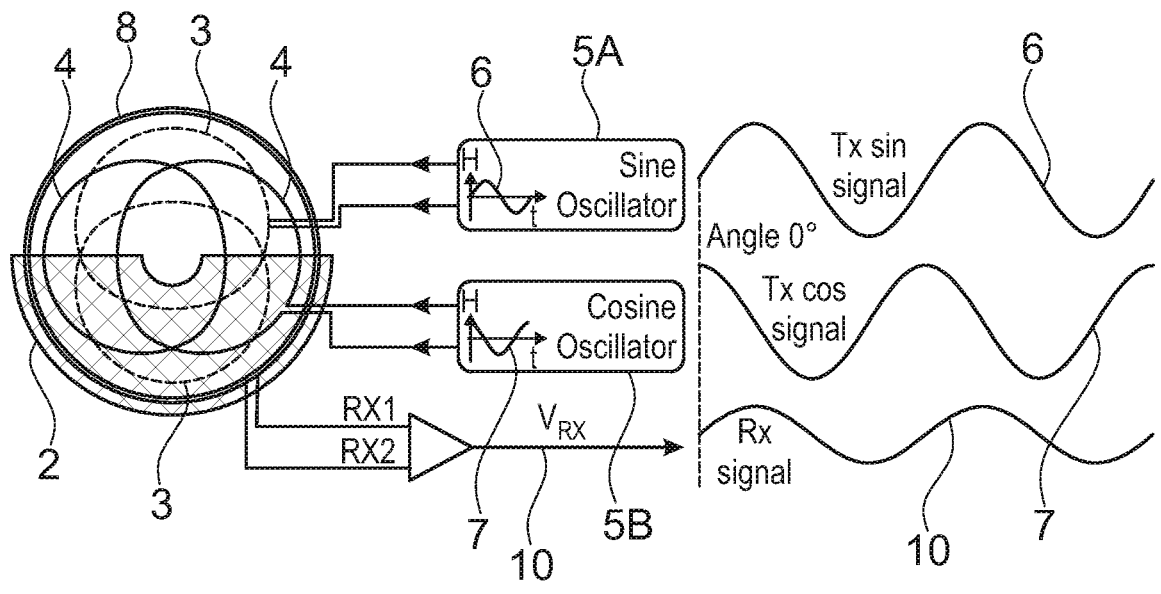

FIG. 3 shows exemplary of the first transmitter signal 6 and the second transmitter signal 7 and the receiver signal 10 for the inductive position sensor 1 with the conductive target 2 at 0°.

Figure 4:
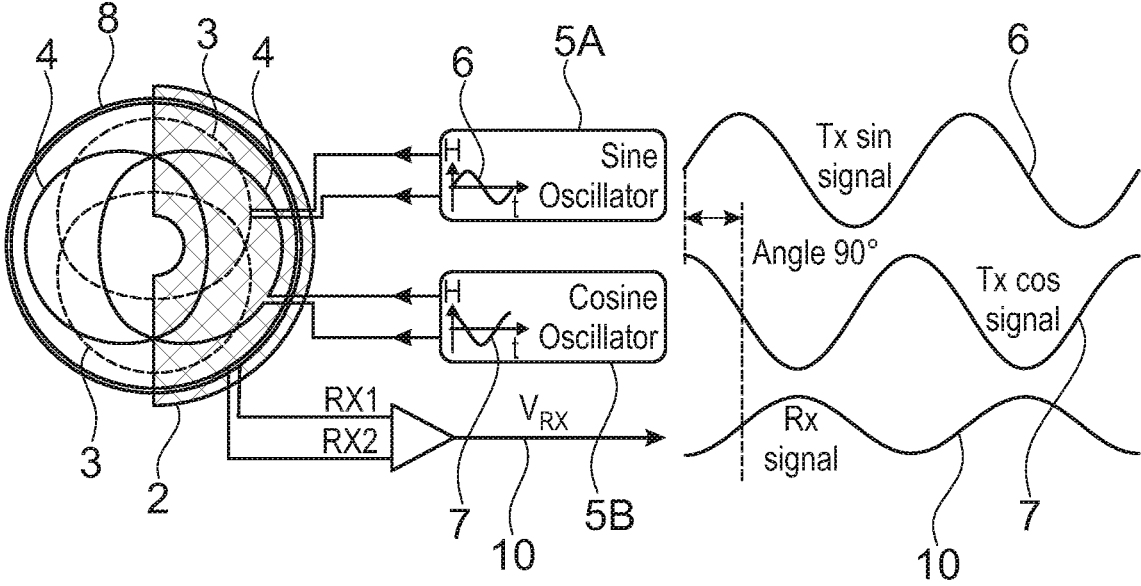

FIG. 4 shows exemplary of the first transmitter signal 6 and the second transmitter signal 7 and the receiver signal 10 for the inductive position sensor 1 with the conductive target 2 at 90°.

Figure 5:
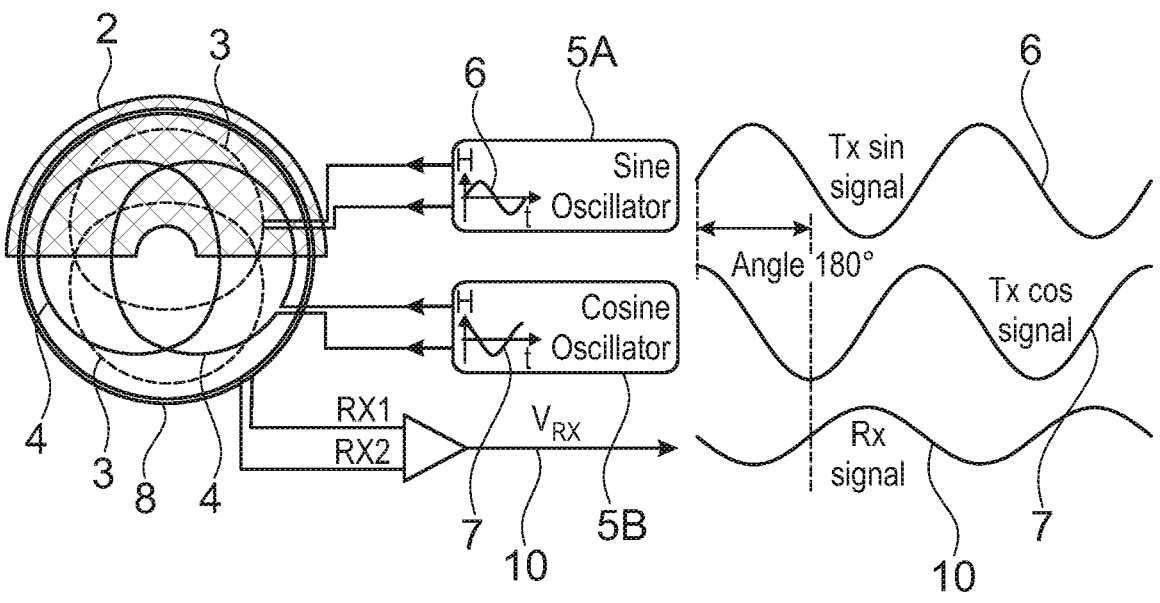

FIG. 5 shows exemplary of the first transmitter signal 6 and the second transmitter signal 7 and the receiver signal 10 for the inductive position sensor 1 with the conductive target 2 at 180°.

Figure 6:
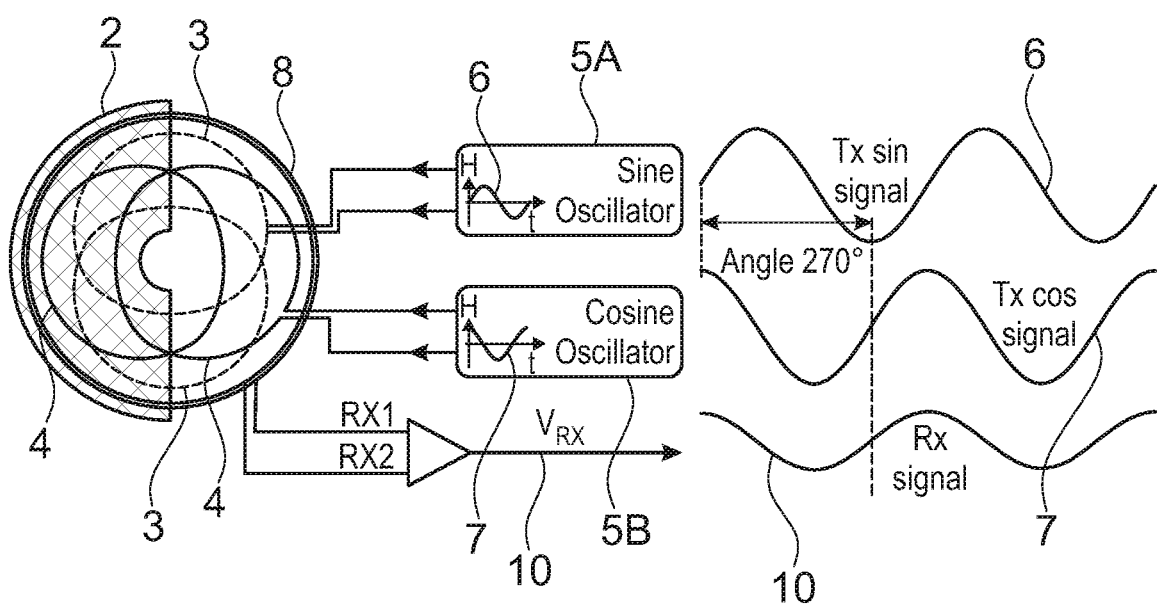

FIG. 6 shows exemplary of the first transmitter signal 6 and the second transmitter signal 7 and the receiver signal 10 for the inductive position sensor 1 with the conductive target 2 at 270°.

As can be seen from FIGS. 3 to 6 the phase of the receiver signal 10 continuously changes with the position of the conductive target 2 above the first transmitter coil 3, the second transmitter coil 4 and the receiver coil 8. By determining the phase-shift of the receiver signal 10 to either the first transmitter signal 6 or the second transmitter signal 7 the position of the conductive target 2 is known.

Figure 7:
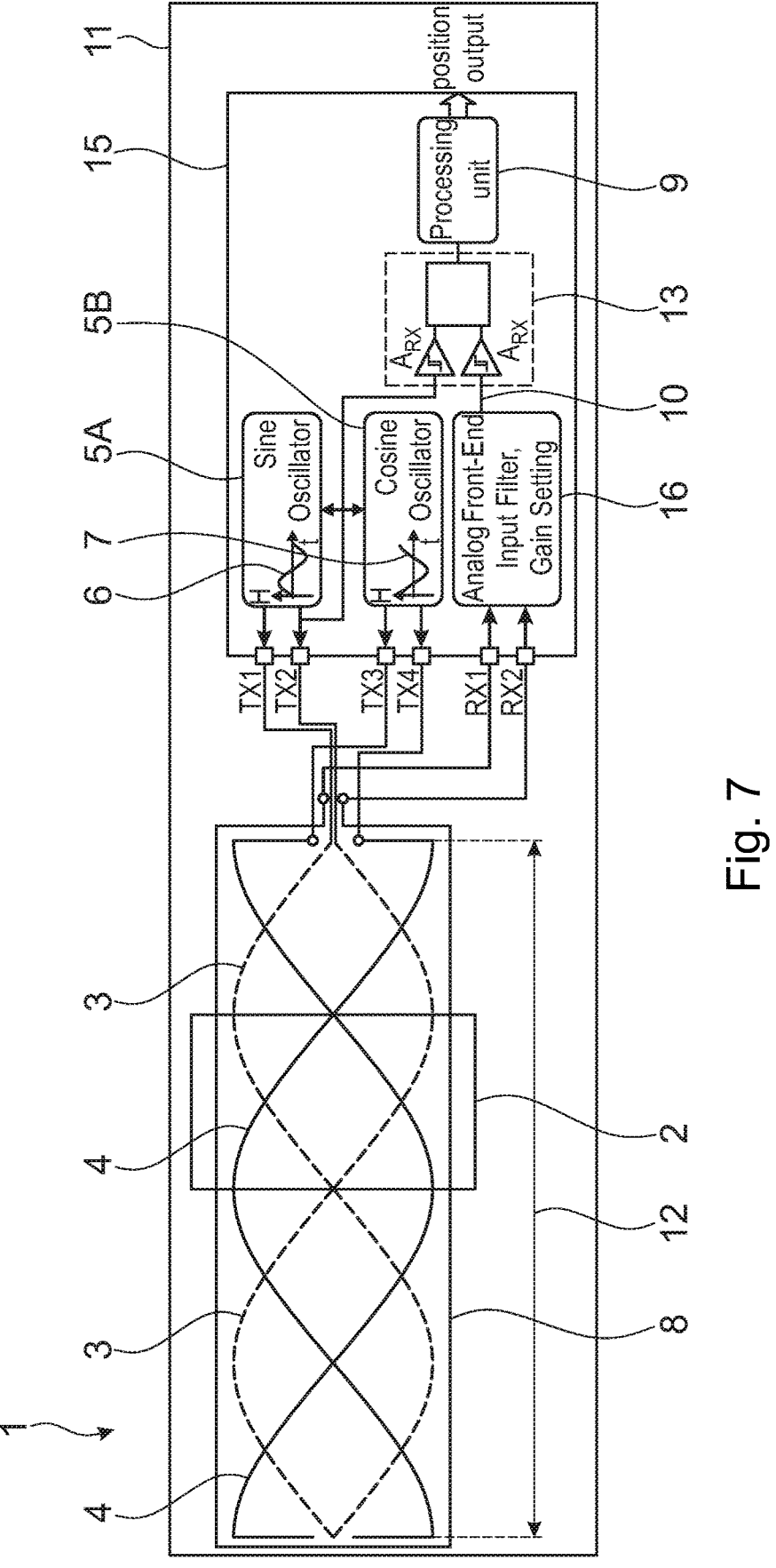

FIG. 7 shows a block diagram of an inductive position sensor 1 according to a second embodiment. The inductive position sensor 1 shown in FIG. 7 is a linear motion position sensor. A conductive target 2 can move along a movement path 12 and a first transmitter coil 3, a second transmitter coil 4 and a receiver coil 8 are arranged along the movement path 12. The movement path 12 can be divided into 360 steps, i.e., from 0° to 360°, as for the inductive position sensor 1 shown in FIG. 1. However, the movement path 12 can be alternatively divided based on any other length scale.

In all other aspects, the second embodiment shown in FIG. 7 corresponds to the first embodiment shown in FIG. 1.

Figure 8:
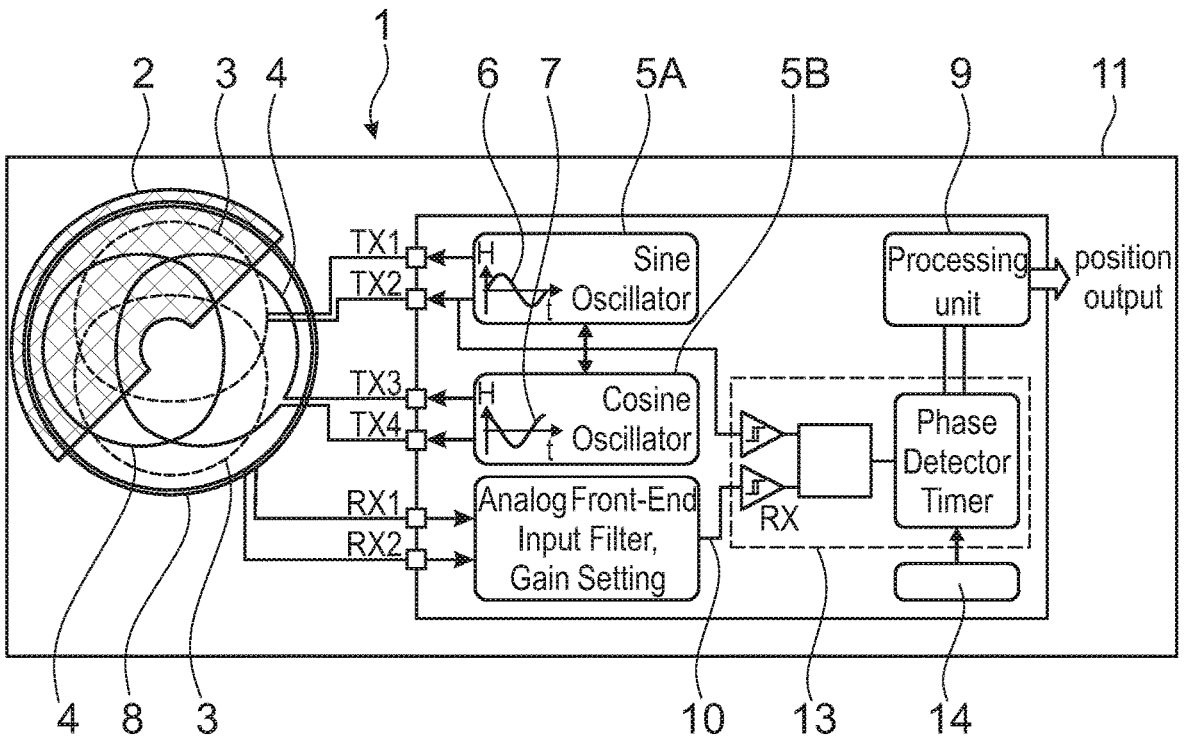

FIG. 8 shows a block diagram of an inductive position sensor 1 according to a third embodiment. This embodiment differs from the first embodiment shown in FIG. 1 in that a counter 14 is used to determine the phase-shift between a first transmitter signal 6 or a second transmitter signal 7 and a receiver signal 10. The counter 14 is for example started at the rising or falling edge of the first transmitter signal 6 at the zero-crossing and stopped when the respective rising or falling edge of the receiver signal 10 has its zero-crossing.

Figure 9:
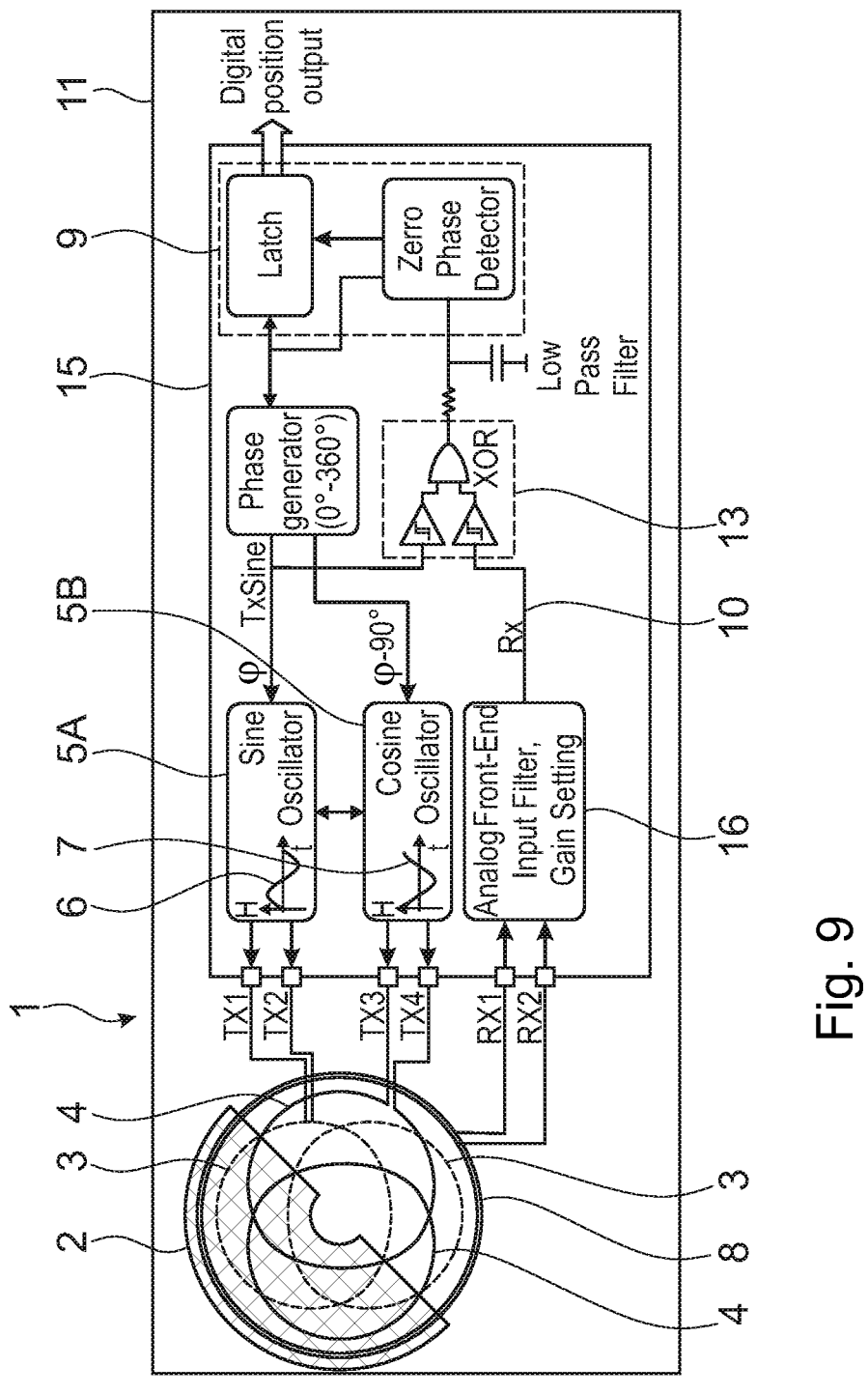

FIG. 9 shows a block diagram of an inductive position sensor 1 according to a fourth embodiment. According to this fourth embodiment, a processing unit 9 in combination with a first oscillator 5A and a second oscillator 5B can adjust the phase of a first transmitter signal 6 and a second transmitter signal 7. The processing unit 9 uses a zero-crossing comparator 13 to change the phase of the first transmitter signal 6 and the second transmitter signal 7, which can be phase-shifted by 90° relative to the first transmitter signal 6, until the first transmitter signal 6 or the second transmitter signal 7 and a receiver signal 10 have identical zero-crossings. The phase change applied to the first transmitter signal 6 and the second transmitter signal 7 by adjusting the first oscillator 5A and the second oscillator 5B corresponds to the position of the conductive target 2.

What is claimed is:

1. An inductive position sensor for detecting a position of a conductive target, the inductive position sensor comprising:

a first transmitter coil and a second transmitter coil, wherein the first transmitter coil and the second transmitter coil comprise respective pairs of partially overlapping loops and the first transmitter coil and the second transmitter coil are phase-shifted 90° relative to each other;

at least one oscillator configured to generate a first transmitter signal and a second transmitter signal, wherein the first transmitter signal and the second transmitter signal have a same shape and are phase-shifted relative to each other and are concurrently applied to the first transmitter coil and second transmitter coil respectively;

at least one receiver coil surrounding the first transmitter coil and the second transmitter coil that is configured to receive a receiver signal;

a zero-crossing comparator configured to detect zero-crossings of the first transmitter signal, the second transmitter signal, and the receiver signal; and a processing unit configured to, when the conductive target is placed above the inductive position sensor:

cause the oscillator to change the phase of the first transmitter signal and the second transmitter signal until the first transmitter signal or the second transmitter signal and the receiver signal have identical zero-crossings; and determine the position of the conductive target based on the change of the phase of the first transmitter signal and the second transmitter signal.

2. The inductive position sensor according to claim 1, wherein the first transmitter signal and the second transmitter signal are phase-shifted by 90°.

3. The inductive position sensor according to claim 1, wherein the pairs of partially overlapping loops of the first transmitter coil and the second transmitter coil are wound in opposite directions.

4. The inductive position sensor according to claim 1, wherein the first transmitter coil, the second transmitter coil and the at least one receiver coil are arranged on a substrate, and wherein the first transmitter coil and the second transmitter coil are superimposed.

5. The inductive position sensor according to claim 1, wherein the inductive position sensor is a radial position sensor and the first transmitter coil, the second transmitter coil, and the at least one receiver coil at least partially surround a rotating shaft configured to have the conductive target attached thereto.

6. A method for detecting a position of a conductive target, the method comprising:

applying a first transmitter signal to a first transmitter coil and a second transmitter signal to a second transmitter coil, wherein the first transmitter coil and the second transmitter coil comprise respective pairs of partially overlapping loops and the first transmitter coil and the second transmitter coil are phase-shifted 90° relative to each other and wherein the first transmitter signal and the second transmitter signal have a same shape and are phase-shifted relative to each other;

receiving a receiver signal by at least one receiver coil that surrounds the first transmitter coil and the second transmitter coil;

detecting zero-crossings of the first transmitter signal, the second transmitter signal, and the receiver signal;

changing a phase of the first transmitter signal and the second transmitter signal until the first transmitter signal or the second transmitter signal and the receiver signal have identical zero-crossings; and determine the position of the conductive target based on the change of the phase of the first transmitter signal and the second transmitter signal.

7. The method according to claim 6, wherein the pairs of partially overlapping loops of the first transmitter coil and the second transmitter coil are wound in opposite directions.

8. The method according to claim 6, wherein the first transmitter coil, the second transmitter coil and the at least one receiver coil are arranged on a substrate, wherein the first transmitter coil and the second transmitter coil are superimposed.

9. The method according to claim 6, further comprising:

detecting a rotational movement of the conductive target around a rotating shaft, wherein the first transmitter coil, the second transmitter coil and the at least one receiver coil at least partially surround the rotating shaft.

10. The method according to claim 6, wherein a phase shift between the first transmitter signal and the second transmitter signal is 90°.

\* \* \* \* \*